C. ALLEN.
SAND AND SLIME SEPARATOR AND CLASSIFIER.
APPLICATION FILED FEB. 10, 1909.

942,697.

Patented Dec. 7, 1909.
3 SHEETS—SHEET 1.

Witnesses.

Inventor
Charles Allen
by Geo. H. Strong
Atty.

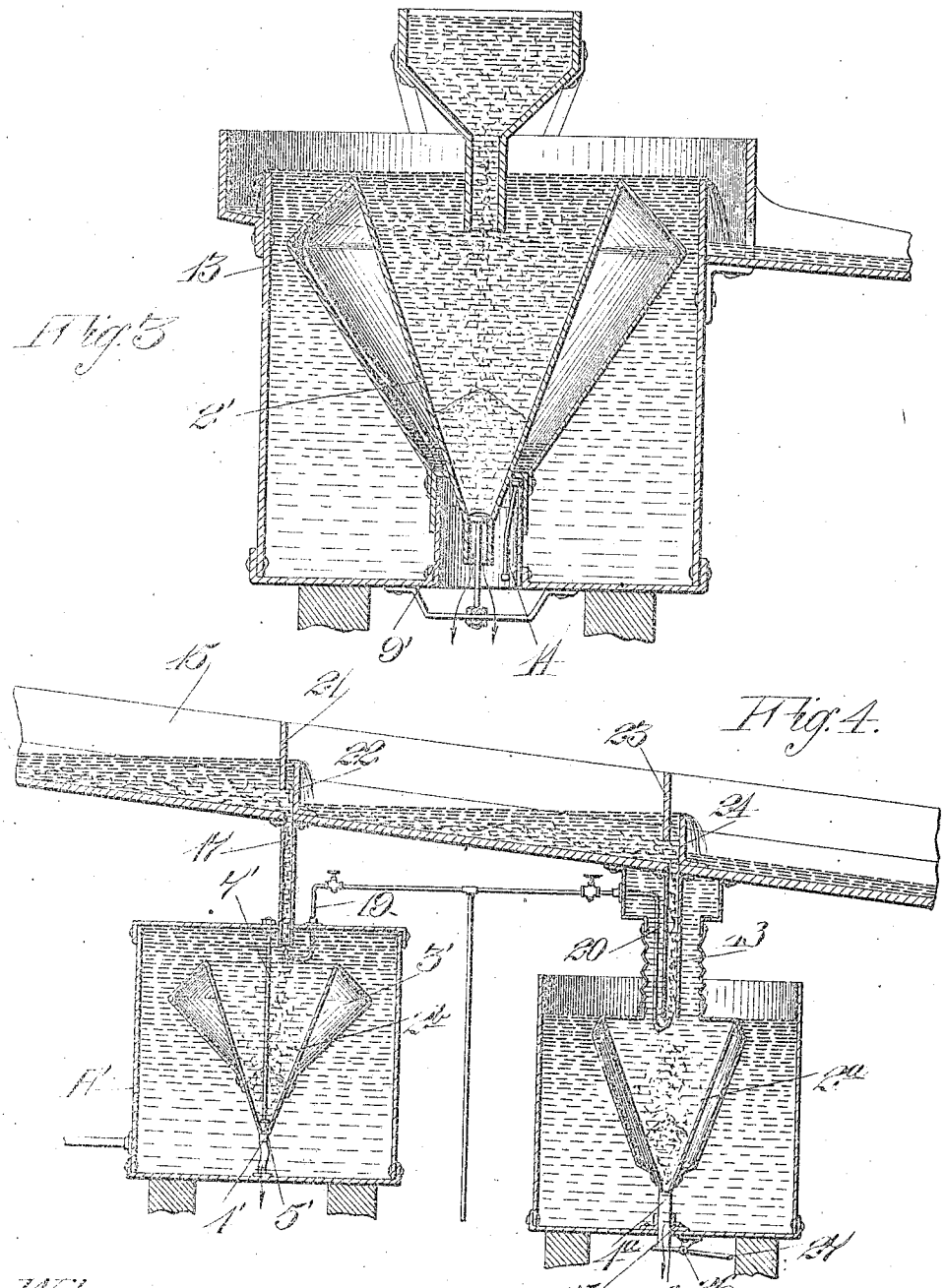

UNITED STATES PATENT OFFICE.

CHARLES ALLEN, OF EL PASO, TEXAS.

SAND AND SLIME SEPARATOR AND CLASSIFIER.

942,697. Specification of Letters Patent. Patented Dec. 7, 1909.

Application filed February 10, 1909. Serial No. 477,188.

*To all whom it may concern:*

Be it known that I, CHARLES ALLEN, a citizen of the United States, residing at El Paso, in the county of El Paso and State of Texas, have invented new and useful Improvements in Sand and Slime Separators and Classifiers, of which the following is a specification.

My invention relates to an apparatus for the separation of solid matters from the liquid in which they are suspended, and pertains especially to a machine for use in mining to separate sand and slime from water, or to thicken slime for concentration, or to clarify water for re-use.

The object of the invention has been to devise a simple, cheap, practical, sensitive separator and classifier suitable for rough, active service, of large capacity, capable of handling all sorts of material, and designed especially for use where the actuating force may be slight, either because of the slight difference between the specific gravity of the substances entering the hopper, or where the substances to be settled consist of very fine slimes.

The invention consists of the parts and the construction and combination of parts as hereinafter more fully described and claimed, having reference to the accompanying drawings, in which—

Figure 1:
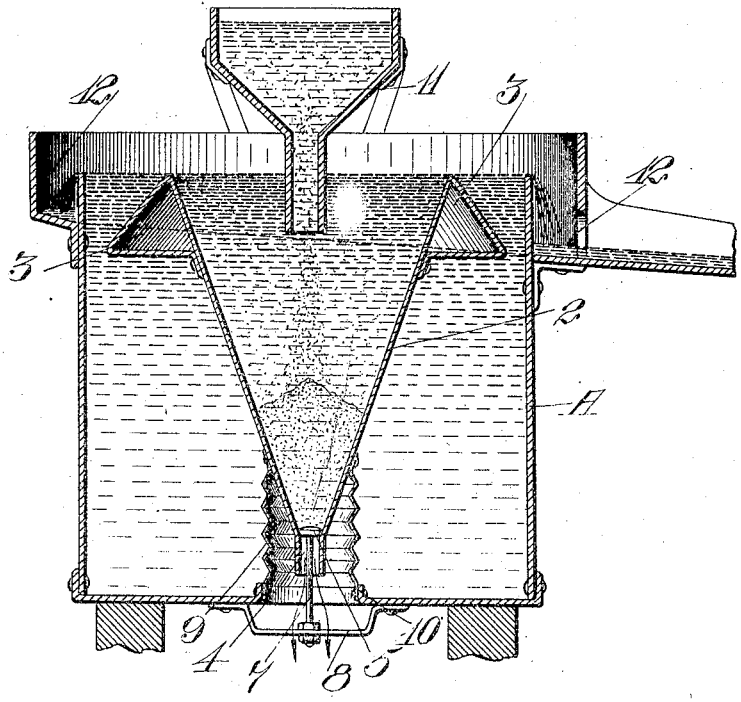
Figure 2:
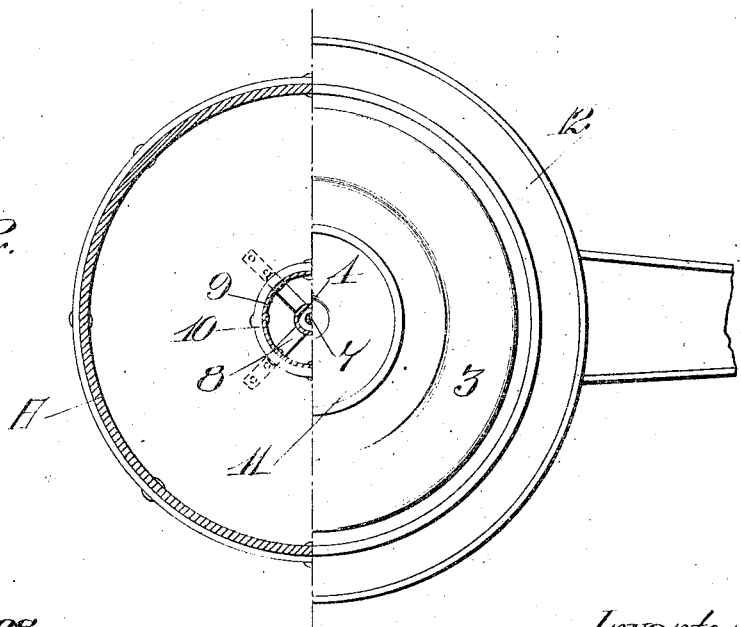
Figure 8:
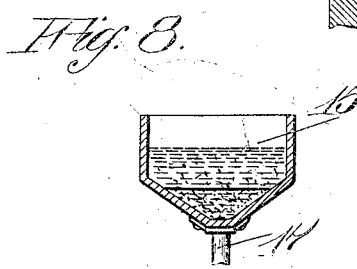
Figure 9:
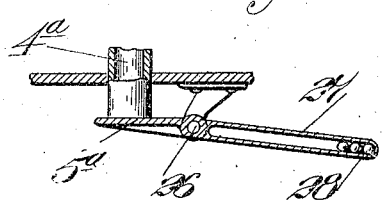

Figure 1 is a vertical section representing the invention. Fig. 2 is a plan of the same in partial section. Figs. 3, 4, 5, 6 and 7 represent modifications of the invention. Fig. 8 is a cross-section through one of the launder discharges of Fig. 4. Fig. 9 is a detail of the valve arrangement employed with the lower separator of Fig. 4.

A represents a stationary tank of any suitable size and description, adapted to contain a liquid, such as water, in which the inverted separating cone or receptacle 2 is partially immersed or suspended. This cone or receptacle 2 is essentially free to fall and rise in the liquid in the tank A, according as the weight in the receptacle is added to, or diminished.

In Fig. 1, the cone is buoyed up by a suitable float or buoy, as 3, encircling the upper inverted end of the cone, and either attached to the cone, or it may be separate therefrom, with the cone dropped into the opening in this float or buoy 3. The lower end of the cone has an outlet 4 adapted to be closed, when the cone lifts, by a fixed valve 5 carried by a stem 7 supported in an underneath rigid bracket 8. A flexible connection, such as 9, surrounds the outlet 4 and is secured at one end to a flange 10 which surrounds an opening in the bottom of the tank A, while the upper end of the flexible connection 9 is fastened to the outside of the cone. The purpose of this flexible connection 9 is to prevent the escape of water from tank A out around the bottom of the cone; and at the same time this flexible connection is of such construction as to prevent its collapsing by reason of the pressure of the water in the tank. The pulp stream or sand and water to be classified are admitted from any suitable source of supply, as the hopper 11.

In operation, the material to undergo classification, with the water in which it is suspended, is admitted, as at 11, into the conical receptacle 2; the solids settling to the bottom of the receptacle, and the water flowing over the edges of the receptacle into the tank A, and thence out, as at 12. The motive force that actuates the machine is the difference in the specific gravity of the substances, such as sand and water, fed to the machine. As the sand or other particles having a specific gravity greater than water settle to the point of the cone, they accumulate until they cause the cone and its suspending means to sink; this vertical movement being possible by means of the flexible tube 9. This tube may be of any suitable form, such, for example, as used in train-line pipes and flexible couplings therefor, or in flexible hose used in such an apparatus. As shown, the lower end of the hose is secured to the end of the flange while the upper end is secured to the lower portion of the separating cone 2. As the cone sinks it opens the sand discharge valve in the bottom of the cone, allowing the settled solids in the cone to pass out through the outlet 4 until the buoyancy of the float 3 overcomes the weight of the cone and contents, when the cone rises, closing the outlet and valve automatically.

It is to be observed that the settling cone is freely suspended in the liquid in tank A, and that the movement of the cone is independent of the means by which it is suspended or supported. This liquid balance gives a sensitiveness not possible in machines using a rigid connection or ordinary fulcruming action.

It is manifest that this dominant idea of a cone suspended or partially submerged in a body of liquid and a valved outlet for the cone, is capable of being embodied in a great variety of forms; and it may undergo various modifications, according to different conditions under which the invention may be practiced. Thus, in Fig. 3, the cone 2' is shown as provided with an air tube 13 extending up into the air chamber to allow the escape of air when water is introduced through the valved pipe 14, which latter is adapted to let water into the float to vary its buoyancy. In this Fig. 3 the liquid is retained in the tank A by providing a suitably-packed telescoping connection 9'.

It is desirable for the float to have sufficient buoyancy to hold up the heaviest kind of settling particles accumulated to a depth over the outlet that will permit them to pass out without much water passing away with them. If the float were adjusted for this work, the buoyancy would be too great when treating material where the settling particles were light; that is, had very little more specific gravity than water. Hence, different floats would have to be used, or the float be weighted in some manner; and by admitting water to the float the air chamber can be easily reduced to the exact point for the most perfect work of which the machine is capable, and one float can treat all kinds of material.

In Fig. 4, I have shown a pair of these separators arranged in conjunction with a launder or pulp sluice 15, the under side of this launder having two discharge tubes 17—18 adapted to deliver solids to the respective suspended cones $2^b$—$2^a$. A jet of water through a pipe 19 is adapted to be directed upward into the tube 17, and a similar jet 20 to be projected upward through the tube 18. The pulp stream as it flows down the launder passes under a baffle 21 adjacent to the outlet 17, and such of the material as is not heavy enough to pass downward through the upwardly ascending current from jet 19 flows up over the baffle 22. Thence it passes down the launder and beneath a baffle 23, and the heavy remaining solid particles fall through the tube 18 and through the upwardly ascending current of the jet 20, to be deposited in the cone $2^a$; the lighter particles and waste water passing on down the launder and over the baffle 24. In this case I have shown two different methods of valve control for the cones $2^b$—$2^a$. In one instance I suspend the valve 5' from above, supporting it on a valve stem 7', the valve being adapted to close the outlet 4' when the cone and its float 3' rise. The outlet 4' in this instance is shown as a flexible non-collapsible hose having its outlet exterior to the tank A', and thus serving the double purpose as a sand outlet, and also as a flexible wall to prevent the escape of the water from tank A'. In the same figure the cone $2^a$ is shown as having a rigid outlet pipe $4^a$ working in a suitable stuffing-box 25, the pipe $4^a$ being open from end to end, but normally closed by contact with a weighted valve plate $5^a$ which is fulcrumed at 26; the valve having a tubular extension 27 containing the balls or weights 28. These balls run toward the fulcrum when the cone descends and the sand outlet opens. When the cone again ascends, and the valve closes, the balls return to the far end of the tube, holding the valve plate $5^a$ tight against the pipe outlet.

Figures 5, 6:
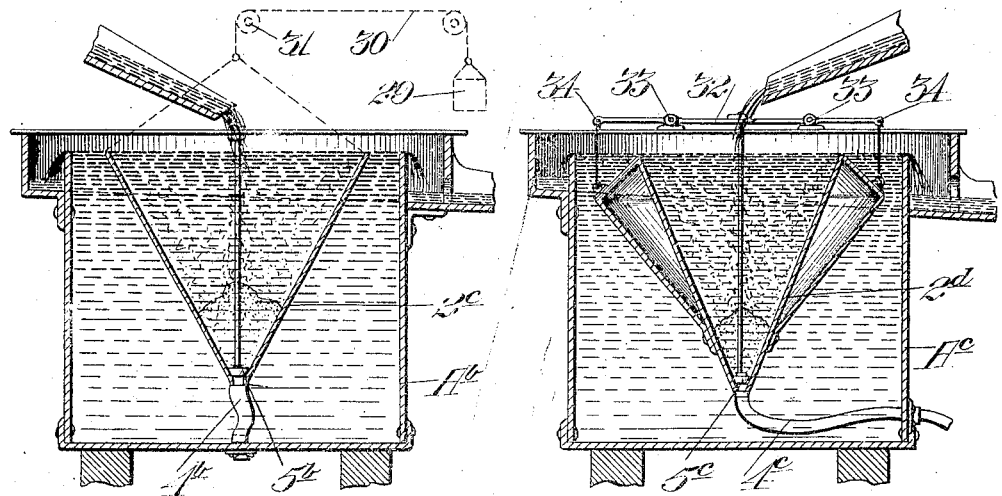

In Fig. 5, I have shown a further modification, in which the cone $2^c$ is partially buoyed up by the displaced water in the tank $A^b$; the weight of the cone and its contents above that of the water displaced, is balanced by a counterweight 29 connected to a rope 30 passing over sheaves 31, the other end of the rope being attached to the cone. The lower end of the cone has a flexible outlet $4^b$ adapted to be closed by a fixed valve $5^b$. In this case, as in the others, the cone is not rigidly supported or fulcrumed, but is free to move up and down in the liquid in the tank $A^b$. This submersion, or partial submersion, is of the greatest importance in this invention, because of the thereby reduced friction and inertia the machine is made sensitive, so that a movement up or down of the cone so as to open or close the valve, results from a slight addition to, or subtraction from, its contents.

In Fig. 6, $2^d$ represents a suspended cone with a discharge for the settled substances comprising a flexible tube $4^c$ passing horizontally to the outside of the tank $A^c$. By this arrangement the valve $5^c$ has its stem connected loosely with the inner ends of a pair of levers 32 which are fulcrumed, respectively, at 33, and the outer ends of the levers connected at 34 with the cone. By means of these levers the valve rises as the cone descends, so that a slight lowering of the cone creates a large discharge opening.

Figure 7:
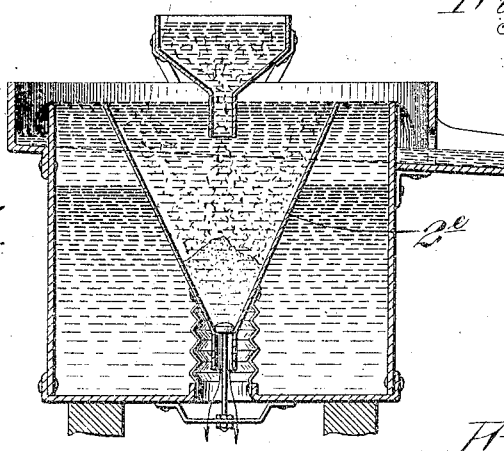

In the foregoing instances I have shown either the counterweight or an air float to buoy up the separating cone, but under some circumstances, as in Fig. 7, the desired buoyancy of the separating cone $2^e$ may be effected by the use of a heavy liquid in the outside tank in which the cone is suspended. Under some circumstances the liquid in the tank may be oil, or it may be one of several solutions of a specific gravity greater than water, in which case if the fluid in the inner cone is water, the weight of the cone and its contents is such that no float or other means of suspension would be needed, the difference between the cone and its contents and the heavy fluid it displaces keeping it in suspension. Take a solution of iodide of methylene; its specific gravity is about 3.34 and it is insoluble in water. Ordinary quartz has a specific gravity of 2.6. Hence, if a receptacle filled with sand is placed in a solution of iodide of methylene, the receptacle containing the sand will be partly immersed, and partly project above the fluid in which it is placed. But supposing only a certain depth of the iodide of methylene is used and the receptacle then filled with water, if the proper depth of each solution is used the lower part of the inner cone will be immersed in the heavier fluid with the upper portion in the water. The inner cone will then be suspended, or float without any "float" air chamber, or other means of giving it buoyancy, and will rise and lower with changes in the weight of its contents the same as if a "float" were used. Hence a float or air chamber, or other means of suspension, is not necessary in all forms of my machine, while the immersion, or partial immersion, is.

Having thus described my invention, what I claim and desire to secure by Letters Patent is—

1. A separator for liquids and solids comprising a liquid-containing tank and a separating vessel in floating suspension in the tank, said separating vessel having an inlet for liquid containing solids in suspension, said vessel having a discharge outlet for the solids, and means for opening and closing said outlet with the rise and fall of the floating vessel.

2. A separating apparatus comprising a liquid-containing tank and an inverted separating cone suspended in the liquid in the tank, said cone having a flexible discharge outlet at its apex extending outside the tank, and a valve supported independent of the cone for said outlet, and means whereby said valve is opened and closed by the rise and fall of the cone in the liquid in the tank.

3. A separator for liquids and solids comprising a liquid-containing tank, a separating vessel in floating suspension in the tank, said vessel having an outlet in its bottom for the solids, and a valve supported independent of said floating vessel to open and close said outlet and means for recovering the separated solids separate from the liquid in the tank.

4. A separator for liquids and solids comprising a liquid-containing tank, an inverted separating cone in floating suspension in the tank, a buoy floating in said tank and suspending said cone, said cone having an outlet for the solids, and a valve for controlling said outlet and means for recovering the separated solids separate from the liquid in the tank.

5. A separator for solids and liquids comprising a liquid-containing tank, an inverted separating cone in floating suspension in the tank, a buoy floating in said tank and suspending said cone, said cone having an outlet for the solids, and a valve for controlling said outlet, said valve supported independent of the cone and means for recovering the separated solids separate from the liquid in the tank and cone.

6. A separator comprising a liquid-containing tank, an inverted separating cone immersed in the tank, a buoy floating in said tank and suspending said cone, said cone having an outlet for the solids, a valve for controlling said outlet, and means for varying the buoyancy of said buoy.

7. A separator comprising a liquid-containing tank, an inverted separating cone immersed in the tank, a buoy floating in said tank and suspending said cone, said cone having an outlet for the solids, a valve for controlling said outlet, and means for varying the buoyancy of said buoy, said last-named means including means for admitting water to the buoy, and means for allowing the escape of air displaced by the water so admitted.

8. A separator comprising a liquid-containing tank, an inverted separating cone immersed in the tank, a buoy floating in said tank and suspending said cone, said cone having an outlet for the solids, and a valve for controlling said outlet, said valve supported independent of the cone, said buoy having a water inlet pipe and an air outlet pipe, whereby the buoyancy of said buoy may be varied.

9. A separator comprising in combination a sluice having a plurality of discharge tubes on its under side, liquid containing tanks, a separating vessel in floating suspension in each tank, said discharge tubes delivering to respective of said separating vessels, said vessels each having a discharge outlet for the solids extending outside the tank, and means for opening and closing said outlets on the rise and fall of their respective vessels.

In testimony whereof I have hereunto set my hand in presence of two subscribing witnesses.

CHARLES ALLEN.

Witnesses:
 U. G. WOLFE,
 H. W. PEACOCK.